(12) United States Patent
Schratz et al.

(10) Patent No.: US 8,201,322 B2
(45) Date of Patent: Jun. 19, 2012

(54) FIBER OPTIC CONNECTOR TOOLING DEVICE

(76) Inventors: Gary F. Schratz, Yelleville, AR (US); Letisha Hall, Flippin, AR (US); Gary W. Phillips, Flippin, AR (US)

( * ) Notice: Subject to any disclaimer, the term of this patent is extended or adjusted under 35 U.S.C. 154(b) by 533 days.

(21) Appl. No.: 12/474,396

(22) Filed: May 29, 2009

(65) Prior Publication Data

US 2010/0301503 A1    Dec. 2, 2010

(51) Int. Cl.
*H01R 43/00* (2006.01)
(52) U.S. Cl. .............. 29/748; 29/754; 29/857; 425/392; 226/162; 385/134
(58) Field of Classification Search .......... 29/747, 29/748, 754, 854, 857, 860; 425/392, 384; 226/162, 163; 385/134, 88–94, 76
See application file for complete search history.

(56) References Cited

U.S. PATENT DOCUMENTS

| | | | |
|---|---|---|---|
| 4,191,447 A | 3/1980 | Borsuk | |
| 4,842,363 A | 6/1989 | Margolin et al. | |
| 5,097,522 A | 3/1992 | Tackett et al. | |
| 5,134,677 A | 7/1992 | Leung et al. | |
| 5,418,876 A | 5/1995 | Lee | |
| 5,754,725 A | 5/1998 | Kuder et al. | |
| 5,772,720 A | 6/1998 | Taira-Griffin et al. | |
| 5,778,125 A | 7/1998 | Busse et al. | |
| 5,901,438 A * | 5/1999 | Kurihara | 29/857 |
| 6,196,730 B1 | 3/2001 | Hammar | |
| 6,196,731 B1 | 3/2001 | Carlisle et al. | |
| 6,428,215 B1 | 8/2002 | Nault | |
| 6,439,780 B1 * | 8/2002 | Mudd et al. | 385/83 |
| 6,786,648 B2 | 9/2004 | Rief et al. | |
| 6,932,515 B2 | 8/2005 | Ngo | |
| 7,153,036 B2 | 12/2006 | Healey et al. | |
| 7,189,007 B2 | 3/2007 | Imanbayev et al. | |
| 7,354,202 B1 | 4/2008 | Luger | |
| 7,364,375 B1 | 4/2008 | Jones | |
| 7,371,082 B2 | 5/2008 | Zimmel et al. | |
| 2003/0063866 A1 | 4/2003 | Melton et al. | |
| 2005/0141817 A1 | 6/2005 | Yazaki et al. | |
| 2008/0019655 A1 | 1/2008 | Vongseng et al. | |
| 2008/0127680 A1 | 6/2008 | Morrill et al. | |

OTHER PUBLICATIONS

Patent Cooperation Treaty—International Searching Authority "Notification of Transmittal of the International Search Report and the Written Opinion of the International Searching Authority, or the Declaration", Jul. 27, 2010, U.S.
http://www.fiberfin.com/products_list.php?cat_id=116 9 , Admitted Prior Art, (undated).

* cited by examiner

*Primary Examiner* — Yogendra Gupta
*Assistant Examiner* — Ninh Le

(57) ABSTRACT

A system and method for creating fiber optic terminations includes a fiber optic connector tooling device and an improved hot plate termination plate or oven. The device cooperates with the oven to produce a fiber optic termination end with optimal light diffusion qualities. The device properly aligns a plastic fiber optic cable and connector with each other and perpendicularly aligns both with the oven. The device provides gradual forward pressure to seat the plastic cable in the connector to melt the second end of the cable and form an optical lens with optimal light diffusion qualities. A method of creating optically clear lens at a termination end of the plastic fiber optic cable uses the fiber optic connector tooling device to assist in holding and guiding the fiber optical cable to the improved oven in proper axial alignment to create a defect free lens.

13 Claims, 3 Drawing Sheets

FIBER OPTIC CONNECTOR TOOLING DEVICE

PRIORITY AND RELATED APPLICATION

N/a

FIELD OF THE INVENTION

The present invention relates to optical fibers. More particularly, the present invention relates to a tooling device for preparing termination ends on optical fibers and a method of making the same.

BACKGROUND OF THE INVENTION

Plastic optical fibers used for data transmission are most often supplied in cable form where the cable comprises a plastic fiber core, a thin cladding, and a protective jacket which can include strengthening members. Optical fiber connectors and splices are used with said fibers and are an essential part of optical fiber communications systems. Connectors may be used to join lengths of optical fiber into longer lengths, or to connect optical fiber to active devices such as radiation sources, detectors, repeaters, or to passive devices such as switches or attenuators.

To prepare a termination end, a fiber end is exposed and a connector is clamped, crimped or molded onto the cable jacket with the bare fiber portion being exposed. There are many methods of terminating and finishing a termination end such as using adhesive, polishing or melting.

In the method using adhesive, adhesive is injected into a longitudinal bore of the connector. A fiber end of the cable is received into the connector body with the enclosed fiber projecting along the longitudinal bore of the connector. The adhesive wicks and adheres to the fiber, the connector, and other connector parts to permanently secure the connector and fiber together.

In the epoxy/polish method of connecting the fiber optic to the connector and forming a lens, epoxy is applied to an end of a fiber optic cable which is then inserted into the connector. An exposed portion of the fiber optic cable that extends past the second end or exit end of the connector is then finished by polishing with a grinder. This method is disadvantageous in that scratches are left on the fiber optic degrades quality of light transmission and causes loss of signal and signal distortion.

In the heat-reset method, the stripped portion of the fiber is inserted into the connector resting just within a chamfer adjacent an exit or second end of the connector and is melted in place to fill the chamfer. See U.S. Pat. No. 4,191,447. In another embodiments of the heat-reset method, a portion of exposed fiber optic may extend past an exit or second end of a connector. See for example, U.S. Pat. No. 5,097,522, where the exposed fiber optic end extending beyond the terminal face is melted using a conventional hot plate that advances into the plastic fiber optic cable that is made molten. The molten fiber optic cable tip forms a bulge that settles and lodges into a chamfer or recessed pocket to restrict movement of the fiber from the connector and to also create a lens. However, for each of these prior art reference outside variables caused by human contact can degrade the quality of lens formed at the termination end of the connector.

One type of heating device used in the prior art includes using a hot plate termination tool or hot plate termination oven such as the one distributed by FiberFin Inc. of Yorkville, Ill. This oven may have integrated circuitry to control two cycle functions, a melting cycle and a curing cycle. The heating cycle heats a hot plate of the tool/oven for about 17 seconds as indicated by a red light, while the curing cycle turns off the heat and uses a fan to cool the hot plate running about 5 seconds. In the heating cycle, the plastic fiber optic is made molten to fill the chamfer and then the curing cycle permits the molten plastic to solidify and create a lens at a second end of the connector, if done correctly.

One problem with this prior art device is that the two cycling events are automated and successive and thus no user control means exist. The user must wait for the next melt or red cycle in order to prepare the termination end. Another problem with the heating device of the prior art is identified in its use of malleable lens against which molten fiber optic cables are smoothed. Such malleable lens include lens made of brass or stainless steel. Once these malleable lens of the prior art are blemished, it becomes difficult to clean them without accidentally marking or nicking the surface. A blemish can then transfer undesired marks onto subsequent termination ends. Yet another problem with the prior art involves the fact that said malleable lens are soldered to the hot plate oven making the change or removal of the lens impossible by the end user. In order change or remove the soldered lens, the user must send the hot plate device back to the manufacturer.

In addition to the above cited problems, prior art hot plate termination ovens are further problematic by the fact that it employs malleable albeit smooth and flat lens. Such malleable lens which are conventionally used in the prior art include plated brass lens or stainless steel lens. In the process of creating the termination lens at the termination end of the connector, these brass or stainless steel lens employed in the prior art hot plate termination ovens often become blemished with residue or other material. If the residue is not removed from the lens, the residue may impair the quality of the termination lens and such impairment will then be transferred to termination ends of subsequent termination ends on cable and connector connections. However, the malleable nature of such brass or steel lens make them prone to scratches, thus making cleaning of such lens become futile. Also, once the lens is marred, subsequent termination lens prepared using the tarnished lens are also defective.

Many of the problems associated with the prior art are attributed to manual labor or human error. Thus, though the heat-reset method does not leave scratches on the cable, problems still exist such as alignment issues. Misalignment of fiber optic lens with the connector is one such example of error due to manual labor. When a fiber optic cable is not properly axially aligned with the connector the entire system can cause degrade the quality of light transmission. Also, traditionally, users guide the cable into a connector and then the hot plate oven using only their hand. Thus the chances of impairing alignment due to human action is very high. Another problem with the prior art involves the amount of manual pressure applied to the fiber optic cable as the termination end is prepared. Excess pressure applied to the cable as it is heated and made molten increase the chance that the fiber optic cable can be defective. Yet another uncontrolled problem present to the prior art involves a lack of control over the timing of heat cycle of the hot plate oven. This variable attributes to termination ends having poor light transmission qualities as uncontrolled timing of heat may cause cables to burn or even bubble.

Another problem with use of hot plate ovens of the prior art is that manual preparation of the termination ends lack inconsistency due to human error. Users find it difficult to create termination ends on fiber optic cables wherein the user has to manually guide the cable onto the hot plate tools without assistance. Also, attaining consistency when preparing numerous termination ends is difficult to achieve using the prior art methods and devices. These uncontrolled variables affect the quality of the termination lens created at the termination end.

There is a growing demand, for a system and method for facilitating the creation of fiber optic terminations. Such a system and method should be easy to use. Such a system should enable a user to attain consistent results. For instance, a device is desired that cooperates with a hot plate tool or hot plate oven. A device is further desired that will permit a user to properly align both the fiber optic cable and connector to the hot plate tool or oven to create a lens with little-to-no manual interference. A device is desired that will permit a user to control the activation of the heat cycle of a hot plate tool or oven. A device is also desired that will permit an appropriate amount of pressure to be applied on the fiber optic cable to create a lens with little-to-no manual labor. A device is desired that permits the production of defect free lens with optimal optical qualities. A device is desired that repeatedly and consistently permits the production of defect free lens with optimal optical qualities. Further what is desired is an improved hot plate tool used to create said termination end with optimal optical qualities. Accordingly, what is sought, and what is not provided by the prior art, is a fiber optic connector tooling device that is easy to use and that can provide consistent results. Also what is sought is an improved method of creating termination ends with optimal optical qualities.

BRIEF SUMMARY OF THE INVENTION

The system and method for creating fiber optic terminations includes a fiber optic connector tooling device and an improved hot plate termination plate or oven. The device cooperates with the oven to produce a fiber optic termination end with optimal light diffusion qualities. The device supports each a plastic fiber optic cable and connector and properly aligns each with an opening of an oven to create a termination end. The properly aligned cable and connector produces an tightly fixed connector/cable termination as a result of the cable having been melted and solidified within a chamfer of the connector. The device also provides gradual forward pressure to ease the plastic fiber optic cable through the connector wherein an optical lens with optimal light diffusion qualities is created at the termination end.

The fiber optic connector tooling device cooperates with a hot plate oven permitting a user to repeatedly and consistently produce defect free lens at a termination end of plastic fiber optic cables. A method of creating optically clear lens at a termination end of plastic fiber optic cable uses the fiber optic connector tooling device to hold a fiber optic cable in proper axial alignment with the improved oven in to create a defect free lens.

DETAILED DESCRIPTION OF THE INVENTION

Figure 1:
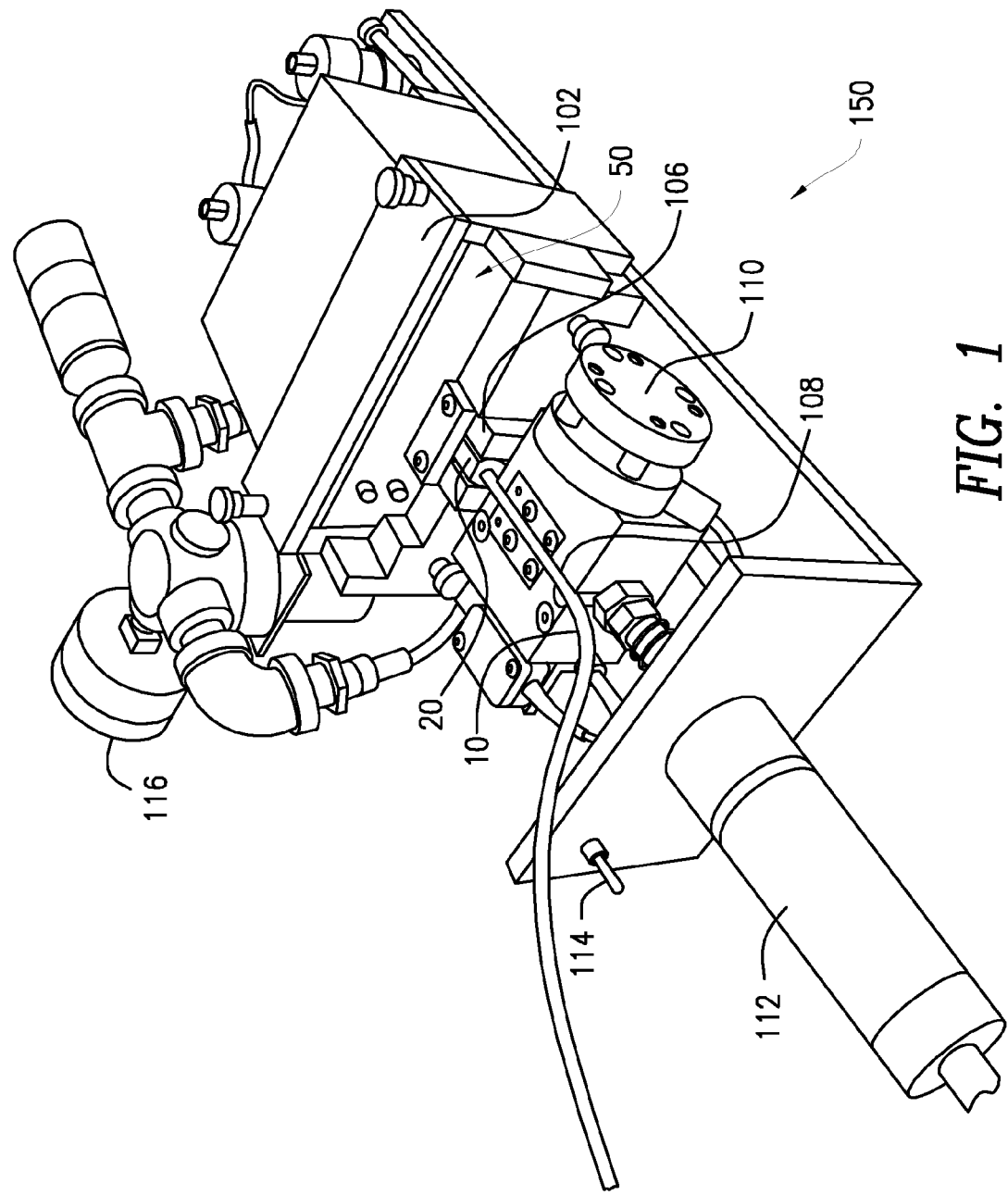
FIG. 1 shows a system for creating fiber optic termination ends including a fiber optic connector tooling device and an improved hot plate termination oven with a fiber optic cable and connector disposed on the system.
Figure 2:
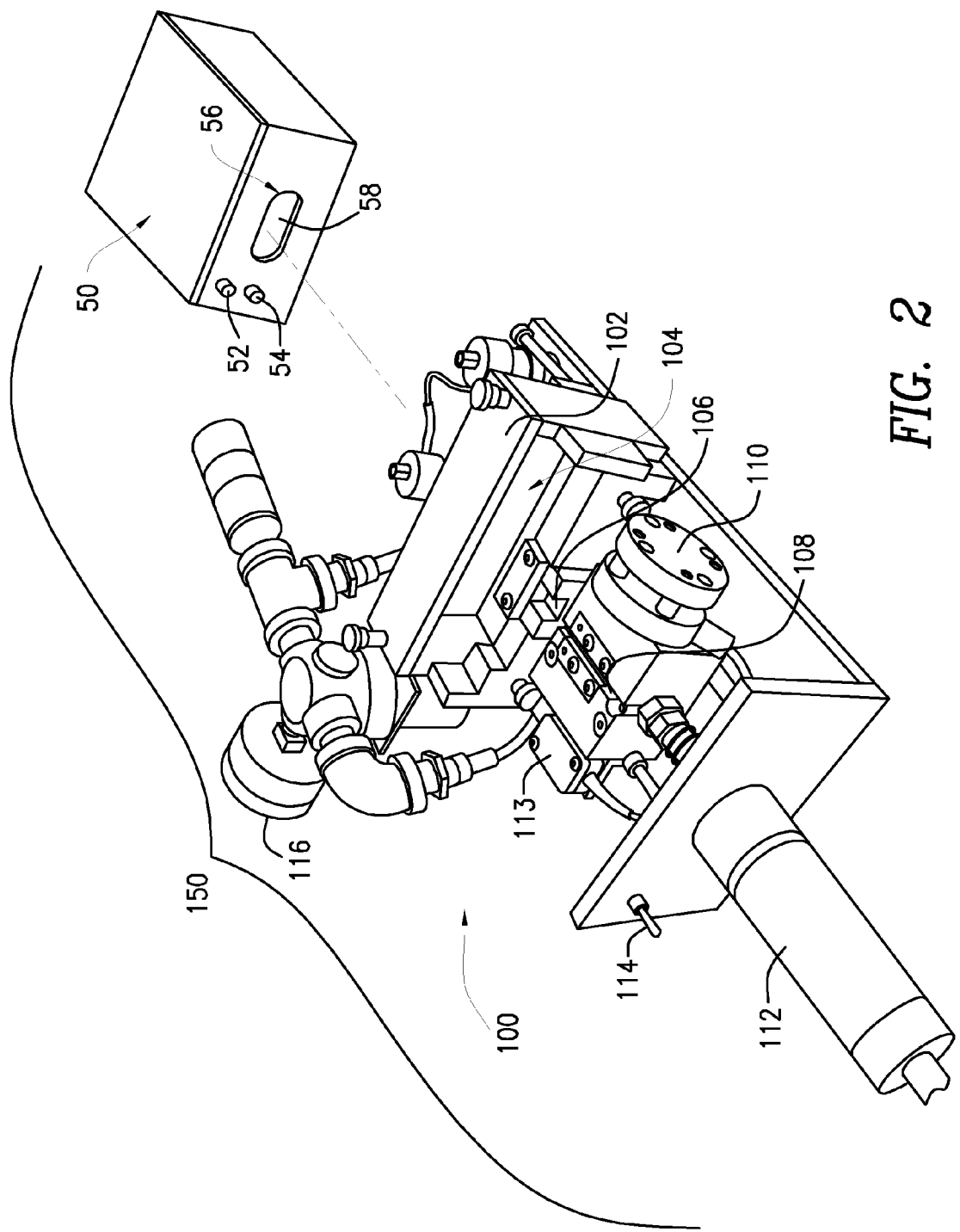
FIG. 2 shows an exploded view of the system of FIG. 1, wherein the improved hot plate termination oven is exploded from the fiber optic connector tooling device.

FIGS. 1 and 2 show a system 150 for creating fiber optic terminations including a fiber optic connector tooling device 100 for use with an improved hot plate oven 50. The device 100 has a frame 102, a hot plate oven receiving cavity 104, connector seat 106, fiber optic cable guide 108, first solenoid 110, second solenoid 112, activator 114 and air pressure regulator 116. The frame 102 defines the cavity 104 to hold the hot plate oven 50. FIG. 1 shows a plastic fiber optic cable 10 and a connector 20 disposed in the guide 108 and the seat 106, respectively, while FIG. 2 shows the oven 50 exploded from the device 100.

The cavity 104 is perpendicularly adjacent to the connector seat 106 and fiber optic cable guide 108. The connector seat 106 and fiber optic cable guide 108 are disposed adjacent and axially aligned with each other to axially align a cable 10 and connector 20 with the hot plate oven 50 retained in the cavity 104. Specifically, the seat 106 is aligned with the opening 56 of the oven 50 while the guide 108 is axially aligned with both the opening 56 of the oven 50 and the seat 106. More specifically, the axially aligned guide 108 and seat 106 are perpendicularly aligned with the opening 56.

Two solenoids, 110, 112 are employed with the device 100 to automatically control the orientation and movement of the cable 10 once the cable 10 and connector 20 are set in the system 150. The solenoid 110 serves as a horizontal clamping solenoid that clamps or grips the connector 20 and fiber optic cable 10 to the device 100. The solenoid 110 properly aligns each the cable 10 and connector 20 into a "position ready" orientation with the opening 56 of the oven 50. The gripping pressure provide by solenoid 110 assists in maintaining said connector 20 and said fiber optic cable 10 in perpendicularly alignment with said oven 50. Accordingly, due to the solenoid 110, the guide 108 can receive the width of any fiber optic cable 10 as the width of the guide 108 is adjustable and controlled by the first solenoid 110.

The second solenoid 112 provides a consistent and controlled forward pressure to gradually push the fiber optic cable 10 forward in the guide 108 through the connector 20 until the fiber optic cable 10 is fully seated in the connector 20. Both solenoids 110, 112 are controlled by the air pressure regulator 116. The regulator 116 provides appropriate forward and horizontal pressure on the cable and connector 20 using the solenoids 110, 112, respectively. Accordingly, once the cable 10 and connector 20 are placed on the device 100, little to no manual intervention is needed to align the cable 10 to the oven 50 or to apply sufficient pressure to fully seat the cable 10. Any type of solenoid may be employed with the invention, some non-limiting examples include a pancake solenoid and a cylinder solenoid such as those manufactured by Bimba Manufacturing Company of Monee, Ill.

The activator 114 cooperates with a relay 113 of device 100 and to provide a manual on/off switch to selectively activate and deactivate the oven 50. In some embodiments, the activator 114 also controls the solenoids 110, 112. Referring back to FIG. 2, the oven 50 cycles between a melting and curing cycle as indicated by a red light 52 and green light 54, respectively. The plastic fiber optic 10 becomes molten during a melt cycle and is then cured in the cure cycle. The hot plate oven 50 shown in the figures is one non-limiting embodiment, other types of ovens 50 may equally be employed with the device 100. Using the system 150, the activator 114 in the "on" position initiates the heat cycle of the oven 150 for a period of time, as indicated by red light 52 and is followed by the curing cycle which is run for another period of time, as indicated by the green light 54.

The improved hot plate oven 50 as shown uses a lens 58 that is made of non-malleable heat conducting material. The preferred non-malleable heat conducting material is glass. Some suitable, yet non-limiting, types of glass include borosilicate or quartz. The glass lens 58 can conduct heat produced by the oven 50 and can be easily removed for cleaning as the glass lens selectively releasable from the oven. The glass lens 58 is retained in the hot plate oven 50 by releasable fasteners, such as clips, disposed inside the oven 50 adjacent the heat generating part of the oven 50. These fasteners are permanently secured to the oven to allow the fastener to releasably receive and hold the glass lens 50.

Figure 3A:
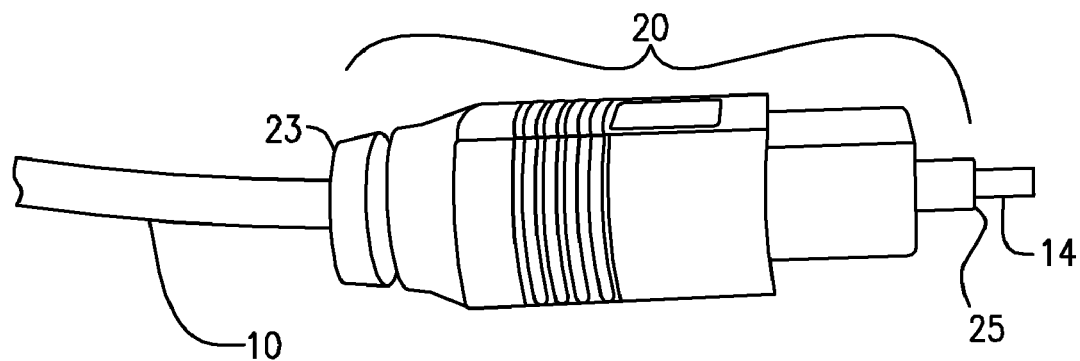
FIG. 3A shows an fiber optic cable and connector before being formed as a termination lens.
Figure 3B:
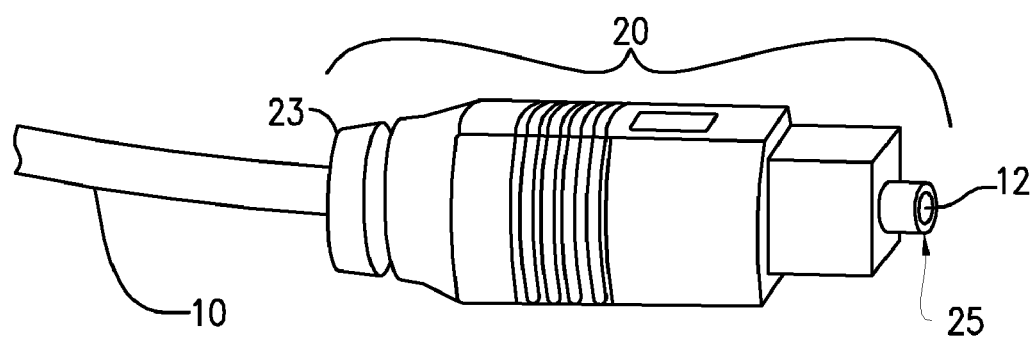
FIG. 3B shows the fiber optic cable and connector after being formed into a termination lens.

The glass lens 58 is visible through the opening 56, which is dimensioned and configured to accept the connector 20 with fiber optic cable 10. The glass lens 58 is used to melt an exposed portion 14 of the plastic fiber optic 10. See FIGS. 3A and 3B. The hot plate oven 50 is an improvement to the oven distributed by FiberFin Inc. of Yorkville, Ill. The improved oven 50 identified herein could also be embodied in other prior art ovens by employing a glass lens 58 as described above.

Using the system 150 a lens 12 is created at the termination end 25 having optimal light conducting properties. See FIG. 3B. Optimal light conducting properties are achieved in the lens 12 as little outside variables are present during creation of the termination end to impair the lens 12. For example, solenoid provides controlled, gradual progression of the cable 10 to the oven 50 while fully seating the cable 10 in the connector 20. By using the solenoid 112, there is no opportunity to impart excess pressure on the cable 10 as it is pressed against the glass lens 58. Excess pressure can causes bubbles to arise in the lens 12. Also, solenoid 110 provides controlled horizontal pressure on the cable 10 and connector 20 to ensure proper alignment in creating the lens 12 at the termination end 25 to further ensure optimal light emitting properties at the lens 12.

The method of creating fiber optic terminations using the system 150 includes preparing the cable 12 prior to being disposed in the tooling device 100. A pre-determined portion of the cable jacket is stripped off of the cable 10 to create the exposed fiber portion 14. The length of jacket stripped off is determined by the amount of material necessary to completely fill the chamfer in the end of the connector. The user then fits the exposed portion 14 through the first end 23 of the connector 20 and out a second end or exit end 25 of the connector 20. See FIG. 3A. The second end 25 is called the termination end 25 once the exposed portion 14 extending past the second end 25 of the connector 20 is prepared into a lens 12, see FIG. 3B.

The cable 10 and connector 20 are then placed on the tooling device 100 so that the connector 20 is disposed in the seat 106 and the cable 10 is disposed through the guide 108. The user clamps the cable 10 and connector 20 in a ready position using the solenoid 110 thereby aligning it with the opening 56 of the oven 50. The seat 106 and guide 108 steadies the cable 10 and connector 20 without the need for manual or human intervention that could easily cause misalignments and impair the termination end.

With the cable 10 and connector 20 in proper axial alignment, the user is ready to activate the system 150. Here, unlike with prior art methods, the user may control the start time for preparing the termination end using the activator 114. The user turns the activator 114 "on" to start the melt cycle, indicated by the red light. In the melt cycle of the system 150, the solenoid 112 eases the fiber optic cable 10 forward through the connector 20 until the cable is fully seated and melts the exposed portion 14 thereby filling a chamfer (not shown) of the connector 20. In some embodiments, the solenoid 112 is turned on when the activator 114 is started, while in other embodiments the solenoid 112 may be turned on independent of the activator 114. As the exposed portion 14 is melted it is smoothed against a glass lens to form the lens 12. After the melt cycle, the cure cycle is initiated to solidify the molten plastic fiber optic 10 into a lens 12. See FIG. 3B. The lens 12 defines the termination end on the connector 20 and cable 10 connection and also serves to retain the cable 10 in the connector 20 by lodging the lens 20 within the chamfer of the connector 20.

On occasion, in the process of creating the lens 12 the glass lens 58 in the oven 50 may be blemished with residue or other material. Unlike, with prior art lens, the improved oven 50, of the present invention, uses a non-malleable glass lens 58 that can easily be cleaned of residue or other extraneous material. The glass lens 58 is removed from the oven 50 and it is wiped clean using any cleaning solution.

The system 150 of the present invention may be employed with any type of connector 20 or any fiber optic cable 10 width as the seat 106 and the guide 108 are adjustable and may be dimensioned and configured to receive any type of connector 20 or any fiber optic cable 10 width. Also, the present invention may be used to prepare one termination end on one cable 10 and connector 20 or a plurality of termination ends on a plurality of cables 10 and connectors 20 at one time.

The present invention is not to be limited in scope by the specific embodiments described herein. Indeed, various modifications of the invention in addition to those described herein will become apparent to those skilled in the art from the foregoing description and accompanying Figures. Such modifications are intended to fall within the scope of the appended claims.

The invention claimed is:

1. A fiber optic connector tooling device comprising:
   at least one connector seat, said connector seat being dimensioned and configured to receive a connector, said connector seat having a first end and a second end;
   at least one cable guide, said cable guide being dimensioned and configured to receive a fiber optic cable, said cable guide having an adjustable horizontal width, said cable guide being disposed at a first end of said connector seat, said cable guide being aligned with said connector seat
   a horizontal clamping solenoid, said solenoid disposed adjacent said cable guide, said solenoid controlling said width of said cable guide in a horizontal direction to accommodate a width of said fiber optic cable, said solenoid being controlled by an air pressure regulator, said solenoid providing controlled horizontal pressure on said fiber optic cable; and
   a heating unit cavity, said cavity being disposed at a second end of said connector seat, said cavity designed to releasably hold a hot plate oven, said hot plate oven having a glass lens, said glass being non-malleable, wherein each said connector seat, and said cable guide are perpendicularly aligned with said hot plate oven when disposed in said cavity,
   whereby when said fiber optic cable is placed through said connector and said fiber optic cable is disposed in said cable guide and said connector is disposed in said connector seat, said fiber optic cable is aligned to said connector being arranged to form a termination lens having optimal optical light conducting properties.

2. The device of claim 1, wherein said connector seat and said cable guide are axially aligned and wherein said fiber optic cable is axially aligned to said connector being arranged to form a termination lens having optimal optical light conducting properties.

3. The device of claim 1, further comprising a forward air pressure regulator device, said forward air pressure regulator device directing said fiber optic cable disposed in said cable guide toward said hot plate oven.

4. The device of claim 3, wherein said forward air pressure regulator device seats said fiber optic cable in said connector.

5. The device of claim 1, further comprising an activator, said activator controlling activation and deactivation of said hot plate oven.

6. The device of claim 1, wherein said fiber optic cable disposed in said cable guide and said connector disposed in said connector seat are each disposed perpendicular to said hot plate oven.

7. The device of claim 1, wherein said non-malleable glass is selected from borosilicate and quartz.

8. A system for creating fiber optic terminations having optimal optical light conducting properties comprising:
   a fiber optic connector tooling device comprising:
      at least one connector seat, said connector seat being dimensioned and configured to receive a connector;
      at least one cable guide, said cable guide having an adjustable horizontal width and being dimensioned and configured to receive a fiber optic cable, said cable guide being axially aligned with said connector seat;
      a heating unit cavity, said heating unit cavity designed to releasably hold a heating unit, said heating unit retaining a selectively releasable non-malleable glass lens, said connector seat and said cable guide being perpendicularly aligned with said heating unit disposed in said cavity;
      a horizontal clamping solenoid, said horizontal clamping solenoid cooperating with and disposed adjacent to said cable guide, said horizontal clamping solenoid adjusting said width of said cable guide in a horizontal direction, said horizontal clamping solenoid providing said cable guide with controlled horizontal gripping pressure, wherein said gripping pressure assists in maintaining said connector and said fiber optic cable in perpendicular alignment with said heating unit; and
      a second solenoid, said second solenoid providing controlled-gradual forward pressure on said fiber optic cable disposed in said cable guide, said pressure provided by said second solenoid being perpendicular to said heating unit.

9. The system of claim 8, further comprising an activator, said activator controlling activation and deactivation of said heating unit.

10. The system of claim 9, wherein said activator further controls said horizontal clamping solenoid and said second solenoid.

11. The system of claim 8, wherein said heating unit is a hot plate oven, said hot plate oven having an opening, said glass lens being disposed in said opening.

12. The system of claim 8, wherein said forward pressure is sufficient to fully seat said fiber optic cable in said connector, said forward pressure directing said fiber optic cable against said non-malleable lens of said heating unit forming termination lens having optimal optical light conducting properties.

13. The system of claim 8, wherein said non-malleable glass is selected from borosilicate and quartz.

\* \* \* \* \*